(12) United States Patent
Zwaga

(10) Patent No.: US 11,305,911 B2
(45) Date of Patent: Apr. 19, 2022

(54) PACKAGING FOR MODIFIED ATMOSPHERE PACKAGING AND METHOD

(71) Applicant: Packable B.V., Almelo (NL)

(72) Inventor: Ronald Zwaga, Almelo (NL)

(73) Assignee: Packable B.V., Almelo (NL)

( * ) Notice: Subject to any disclaimer, the term of this patent is extended or adjusted under 35 U.S.C. 154(b) by 190 days.

(21) Appl. No.: 16/463,482

(22) PCT Filed: Oct. 2, 2017

(86) PCT No.: PCT/EP2017/074996
§ 371 (c)(1),
(2) Date: May 23, 2019

(87) PCT Pub. No.: WO2018/095620
PCT Pub. Date: May 31, 2018

(65) Prior Publication Data
US 2019/0359375 A1 Nov. 28, 2019

(30) Foreign Application Priority Data

Nov. 28, 2016 (EP) .................................... 16200964

(51) Int. Cl.
*B65D 5/60* (2006.01)
*B31B 50/44* (2017.01)
(Continued)

(52) U.S. Cl.
CPC ................ *B65D 5/60* (2013.01); *B29C 65/02* (2013.01); *B29C 66/7486* (2013.01);
(Continued)

(58) Field of Classification Search
CPC .. B65D 77/062; B65D 77/06; B65D 77/2024; B65D 25/14; B65D 21/0233;
(Continued)

(56) References Cited

U.S. PATENT DOCUMENTS 3,154,215 A * 10/1964 Vesconte ............ B65D 21/0233
206/518
4,199,097 A * 4/1980 Christensson ....... B65D 5/2019
229/106
(Continued)

FOREIGN PATENT DOCUMENTS

CA 2353684 A1 12/1999
DE 19828381 A1 12/1999
(Continued)

*Primary Examiner* — Stephen J Castellano
(74) *Attorney, Agent, or Firm* — The Webb Law Firm

(57) ABSTRACT

A packaging for modified atmosphere packaging includes a flangeless cardboard tray having a bottom and an upstanding peripheral wall. A plastic flange is arranged on top of the edge of the peripheral wall. The plastic flange has in cross-section a first part extending horizontally, substantially parallel to the bottom of the tray, a second part depending from the first part downward along the outside of the peripheral wall and a third part depending from the first part, opposite of the second part, along the inside of the peripheral wall. A plastic barrier foil is adhered to and lines the inside of the cardboard tray and extends over the plastic flange to fix the plastic flange onto the flangeless cardboard tray.

13 Claims, 5 Drawing Sheets

(51) Int. Cl.
*B29C 65/02* (2006.01)
*B29C 65/00* (2006.01)
*B65D 21/02* (2006.01)
*B65D 77/20* (2006.01)
*B31B 120/40* (2017.01)
*B31B 105/00* (2017.01)
*B31B 110/35* (2017.01)
*B31B 120/00* (2017.01)
*B29L 31/00* (2006.01)
*B29C 45/14* (2006.01)
*B29C 39/02* (2006.01)
*B29C 45/16* (2006.01)

(52) U.S. Cl.
CPC .......... *B31B 50/44* (2017.08); *B65D 21/0233* (2013.01); *B65D 77/2024* (2013.01); *B29C 39/02* (2013.01); *B29C 45/14* (2013.01); *B29C 45/16* (2013.01); *B29L 2031/712* (2013.01); *B31B 2105/0024* (2017.08); *B31B 2110/35* (2017.08); *B31B 2120/002* (2017.08); *B31B 2120/404* (2017.08); *B65D 5/603* (2013.01)

(58) Field of Classification Search
CPC .......... B65D 5/603; B65D 5/60; B31B 50/44; B31B 2120/404; B31B 2120/002; B31B 2105/0024; B31B 2110/35; B29L 2031/712; B29C 65/02; B29C 66/7486; B29C 45/14; B29C 45/16; B29C 39/02

USPC .................................................... 220/908.1
See application file for complete search history.

(56) References Cited

U.S. PATENT DOCUMENTS

| | | | | |
|---|---|---|---|---|
| 4,765,579 | A | * | 8/1988 | Robbins, III ............. B65F 1/06 220/495.04 |
| 5,048,716 | A | | 9/1991 | Bodet et al. |
| 6,039,185 | A | * | 3/2000 | Pedracine ........... H01M 50/216 206/704 |
| 7,398,913 | B2 | * | 7/2008 | McClure ................ B65D 5/029 220/495.08 |
| 8,006,855 | B2 | * | 8/2011 | Lapoint, III ....... B65D 88/1631 220/9.4 |
| 2010/0038363 | A1 | * | 2/2010 | Kies .................... B29C 65/7805 220/212 |
| 2011/0065556 | A1 | | 3/2011 | Middleton et al. |
| 2014/0131428 | A1 | | 5/2014 | Balke |
| 2016/0016685 | A1 | | 1/2016 | Bauemfeind |

FOREIGN PATENT DOCUMENTS

| | | |
|---|---|---|
| DE | 10111232 A1 | 9/2002 |
| DE | 102013006309 A1 | 10/2014 |
| EP | 0072742 A2 | 2/1983 |
| EP | 0816239 A1 | 1/1998 |
| EP | 2726380 | 5/2014 |

* cited by examiner

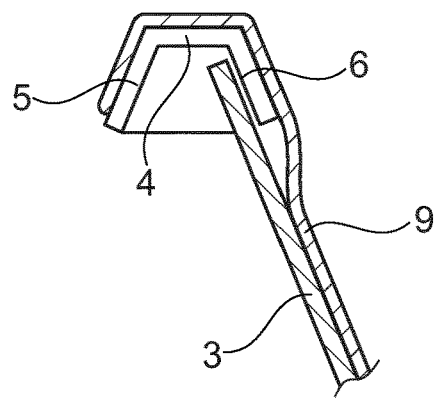
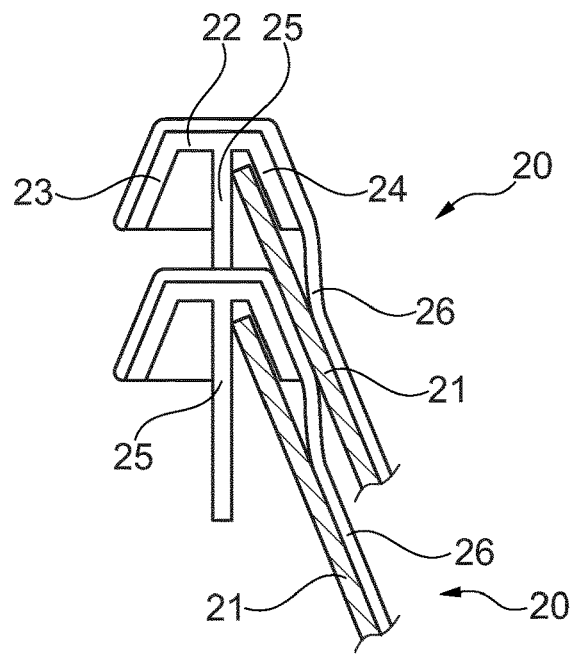
Fig. 3A          Fig. 3B
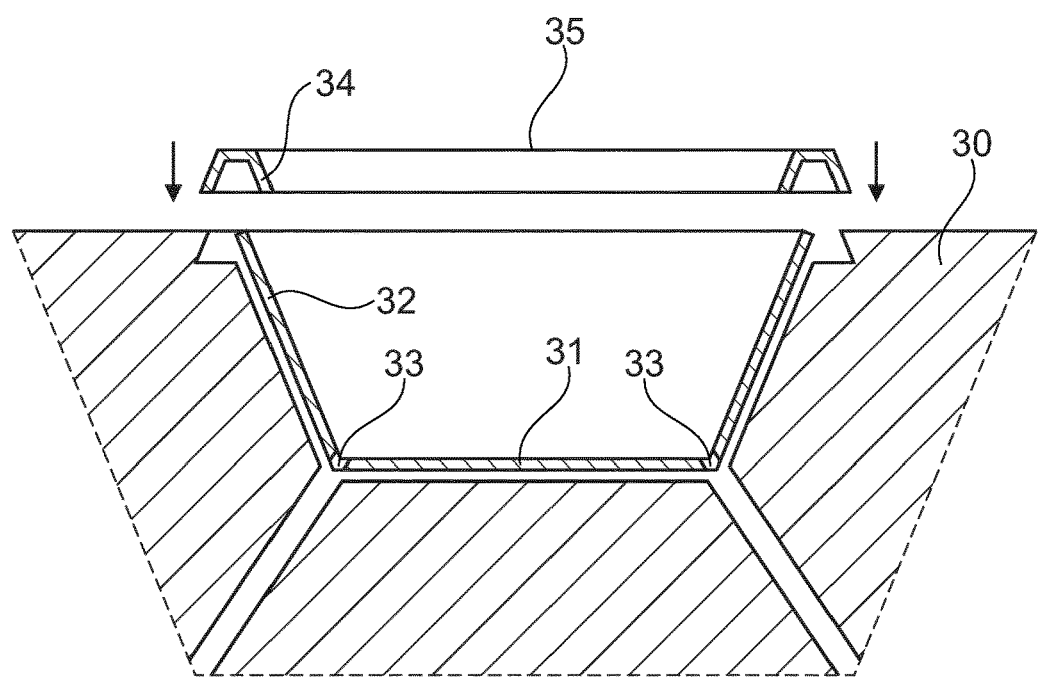
Fig. 4

PACKAGING FOR MODIFIED ATMOSPHERE PACKAGING AND METHOD

CROSS-REFERENCE TO RELATED APPLICATIONS

This application is the United States national phase of International Application No. PCT/EP2017/074996 filed Oct. 2, 2017, and claims priority to European Patent Application No. 16200964.1 filed Nov. 28, 2016, the disclosures of which are hereby incorporated by reference in their entirety.

BACKGROUND OF THE INVENTION

Field of the Invention

The invention relates to a packaging for modified atmosphere packaging. Such a packaging is for example known from EP 2726380.

Description of Related Art

EP 2726380 discloses a packaging, wherein first a cardboard tray is formed out of an unfolded sheet, wherein the cardboard tray has at the upper edge of the peripheral wall a horizontal flange. Over this flange, a separate plastic flange with a horizontal part and a part depending downward on the outside of the flange of the tray is positioned. Then a plastic barrier foil is arranged in the tray by vacuum, such that the plastic barrier foil lines the cardboard tray and extends over the plastic flange, fixing the plastic flange to the cardboard tray. The plastic flange allows for easy separation of the plastic from the cardboard when the packaging is discarded.

However, a cardboard tray with a horizontal flange folded out of an unfolded sheet cannot have rounded corners. This thus limits the design freedom of the appearance of such prior art packaging.

Furthermore, if existing plastic packaging is to be substituted for more environment friendly cardboard packaging, such as packaging according to EP 2726380, the existing production lines need to be substantially adapted as the molds need to be able to handle the straight cornered cardboard packaging.

It is an object of the invention to reduce the above mentioned disadvantages and allow for cardboard packaging, which is not restricted to straight corners due to the presence of a horizontal flange.

SUMMARY OF THE INVENTION

This object is achieved by the invention with a packaging for modified atmosphere packaging, comprising:
- a flangeless cardboard tray having a bottom and an upstanding peripheral wall;
- a plastic flange arranged on top of the edge of the peripheral wall, which plastic flange has in cross-section a first part extending horizontally, substantially parallel to the bottom of the tray, a second part depending from the first part downward along the outside of the peripheral wall and a third part depending from the first part, opposite of the second part, along the inside of the peripheral wall;
- a plastic barrier foil adhered to and lining the inside of the cardboard tray and extending over the plastic flange to fix the plastic flange onto the flangeless cardboard tray.

By using a flangeless cardboard tray the shape of the corners of the tray is no longer restricted to square corners. Instead it is also possible to provide rounded corners or even randomly shaped corners. This allows for the packaging to be fitted in any existing topseal tool.

The plastic flange is shaped to match the shape of the upper edge of peripheral wall of the tray. The second part and third part depending downward along the outside and the inside of the peripheral wall respectively, ensure that the shape of the cardboard tray is maintained as soon as the plastic flange is positioned on top of the peripheral wall. This allows for a reliable arrangement of the plastic barrier foil afterwards.

The plastic flange also provides strength and rigidity to the packaging, allowing for a thinner cardboard to be used and even virgin cardboard material can be used, which is of advantage in for example high care environments, where recycled materials are not preferred.

Furthermore, the plastic flange can be suitably shaped for a lid, allowing for the packaging to be reclosed by a snap connection with the lid, after a closing foil has been removed. With prior art cardboard flanges, the arrangement of a lid is less reliable.

The packaging according to the invention has the further advantage that the barrier foil can easily be removed from the cardboard by pulling the plastic flange. Also the edges of the barrier foil can easily be melted around the plastic flange, such that a user, when removing the cover foil from the packaging does not accidentally In a preferred embodiment of the packaging according to the invention at least one spacer protrusion is arranged to the first part of the plastic flange, which at least one spacer protrusion depends downward along the outside of the peripheral wall.

Due to the use of a plastic flange, it is possible to form at least one spacer protrusion to the plastic flange. This at least one spacer protrusion allows for the packaging according to the invention to be nested, while the spacer protrusion ensures that the trays are sufficiently spaced apart when nested, such that the nested packaging can easily be de-nested.

In another preferred embodiment of the packaging according to the invention the plastic flange is provided with a perforation line extending over the width of the flange and wherein a tear lip is arranged to the plastic flange adjacent to the perforation line.

After use of the packaging, the tear lip and the perforation line allow for the plastic flange to be cut, such that the structural strength of the plastic flange is reduced and the plastic flange can be bent easier which contributes to the ease of removing the barrier foil from the flangeless cardboard tray.

In yet another embodiment of the packaging according to the invention the flangeless cardboard tray is folded out of an unfolded sheet, wherein the bottom of the flangeless cardboard tray has rounded corners and wherein slits are formed between the rounded corners of the bottom and the peripheral wall.

As the cardboard tray of the invention is flangeless, the unfolded sheet can be cut-out with a bottom in a desired form and flaps attached to the bottom, which are folded up and will follow the contours of the bottom. For the parts, for example rounded corners, of the bottom, which do not have a straight edge and could not be used as folding line, the adjacent part of the peripheral wall will be loose from the bottom. This provides a slit between the bottom and the peripheral wall, which slit can be used to generate a vacuum or low pressure inside of the cardboard tray in order to pull in and press the plastic barrier foil against the walls.

Preferably, a cover foil is sealed onto the plastic flange. The cover foil closes the packaging after the packaging has been filled with for example foodstuff. The plastic flange has a flat top provided by the first part of the cross-section, which ensures a good and airtight sealing of the cover foil.

In a further preferred embodiment of the packaging according to the invention, a number of positioning holes are provided along the upper part of the peripheral wall.

These positioning openings allow for protrusions arranged in a mold or in a link of a transport chain to interlock and provide a reliable positioning of the tray into the mold or link.

In still another embodiment of the packaging according to the invention at least one flap is arranged in the peripheral wall to provide an opening in the peripheral wall for better grip.

The flap can be pushed inside of the tray, such that part of the barrier foil lining the tray is loosened and a user can get a better grip on the tray by the formed opening in the peripheral wall. This aids in easy separation of the plastic flange and plastic barrier foil from the cardboard tray.

The invention also relates to a method for manufacturing a packaging according to the invention, which method comprises the steps of:

- providing, for example by injection molding or deep drawing, a plastic flange having in cross-section a first part extending horizontally and a second part depending from the first part;
- providing an unfolded cardboard sheet and inserting the unfolded sheet into a mold to form a flangeless cardboard tray having a bottom and an upstanding peripheral wall;
- positioning the plastic flange onto the upper edge of the upstanding peripheral wall, such that the second part of the plastic flange extends downward along the outside of the peripheral wall;
- providing a plastic barrier foil over the plastic flange, heating said plastic barrier foil and pushing the heated plastic barrier foil into the formed cardboard tray, such that the plastic barrier foil adheres to and lines the inside of the cardboard tray and extends over the plastic flange to fix the plastic flange onto the flangeless cardboard tray.

With the method according to the invention a packaging according to the invention is provided. When the plastic flange is positioned on top of the edge of the peripheral wall, the plastic flange keeps the peripheral wall together. The mold could be shaped such that the second part of the flange snaps into a groove in the mold to secure the plastic flange when the barrier foil is not yet applied to fix the plastic flange to the peripheral wall.

In a preferred embodiment of the method according to the invention the plastic barrier foil is first fixed to the plastic flange, before the plastic flange is positioned onto the upper edge of the upstanding peripheral wall.

When the plastic barrier foil is first fixed to the plastic flange, the gripping surface is substantially increased allowing for a easier positioning of the plastic flange into the mold onto the upper edge of the peripheral wall.

Furthermore, when the already fixed plastic barrier foil is heated again to be pushed into the formed cardboard tray, the edge of the plastic barrier foil can be sealed to the second part of the plastic flange providing a firm connection between the plastic barrier foil and the plastic flange. It also prevents a user, after a closing foil is arranged on the packaging, from pulling the wrong layer of foil, when trying to open the packaging.

In yet another preferred embodiment of the method according to the invention, after folding of the flangeless cardboard tray slits are provided between the bottom and the bottom edge of the peripheral wall and wherein a low pressure is generated on the outside of the flangeless cardboard tray, such that the heated plastic barrier foil is pushed into the cardboard tray by a pressure difference over the heated plastic barrier foil.

BRIEF DESCRIPTION OF THE DRAWINGS

These and other features of the invention will be elucidated in conjunction with the accompanying drawings.

FIG. 3A shows a detail of the upper edge of the packaging of FIG. 1.

FIG. 3B shows a detail of the upper edge of a second embodiment of the packaging according to the invention.

FIG. 4 shows a schematic cross-sectional view of a first step of a method according to the invention.

DESCRIPTION OF THE INVENTION

Figure 1:
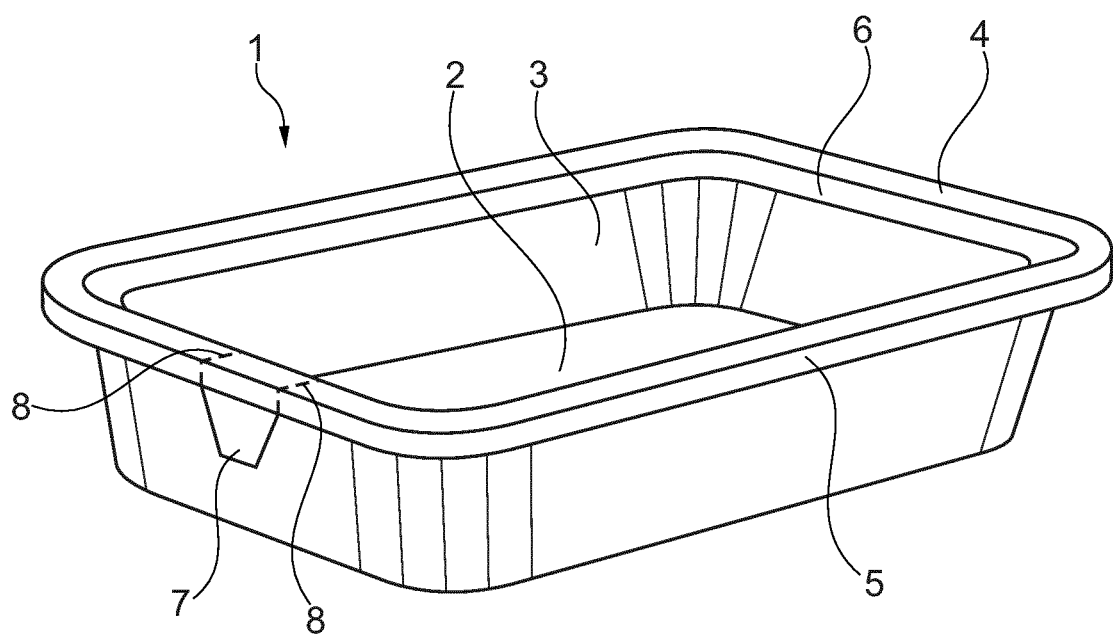
FIG. 1 shows a perspective view of a first embodiment of a packaging according to the invention.

FIG. 1 shows a perspective view of a packaging 1 according to the invention. The packaging 1 has a bottom 2 and a peripheral wall 3 out of cardboard. The bottom 2 and the peripheral wall 3 have rounded corners.

A plastic flange 4, 5, 6 is arranged on top of and in direct contact with the upper edge of the peripheral wall 3. The plastic flange has a horizontal first part 4, a second part 5 depending downward along the outside of the peripheral wall 3 and a third part 6 depending downward along the inside of the peripheral wall 3.

A tear lip 7 is provided on the outside of the plastic flange 4, 5, 6 and perforation lines 8 are provided in the first part 4, the second part 5 and the third part 6 of the plastic flange. With tear lip 7 a user can tear loose a part of the plastic flange 4, 5, 6 such that the plastic flange 4, 5, 6 can be separated easier from the cardboard 2, 3.

Figure 2:
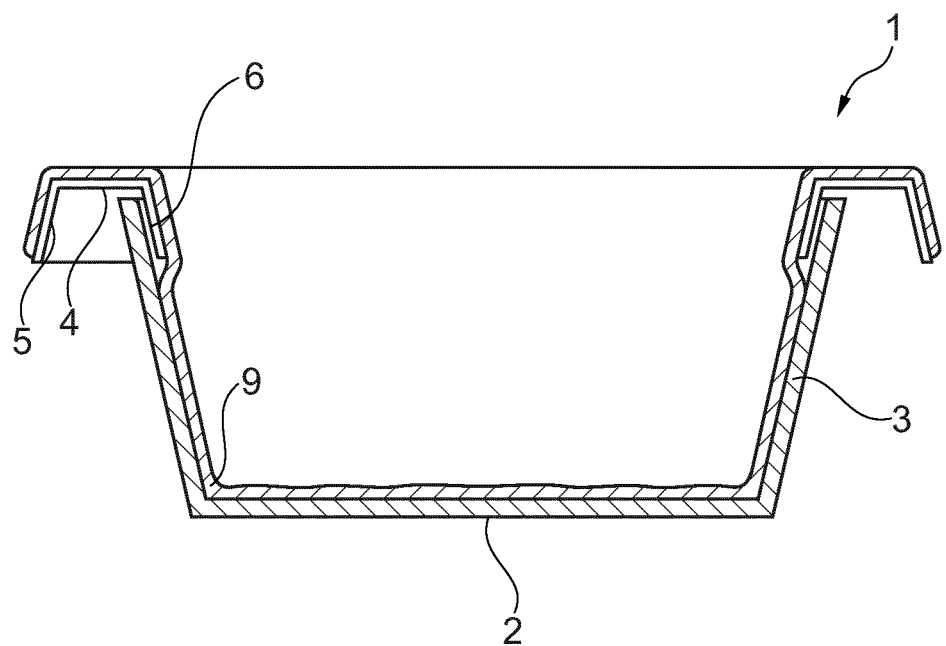
FIG. 2 shows a cross-sectional view of FIG. 1.

FIG. 2 shows a cross-sectional view of the packaging 1 from which it is more clear that the first part 4 of the plastic flange 4, 5, 6 provides a continuous horizontal flange and the third part 6 lies against the inner surface of the peripheral wall 3 and wherein the second part 5 is spaced outwardly from the upper edge of the peripheral wall 3.

The inside of the flangeless cardboard tray 2, 3 is lined with a plastic barrier foil 9, which is sealed to the bottom 2, the peripheral wall 3 and the plastic flange 4, 5, 6, such that the plastic flange 4, 5, 6 is fixed to the flangeless tray 2, 3. (see also FIG. 3A)

FIG. 3B shows a detail of the upper edge of a second embodiment of the packaging 20 according to the invention.

The packaging 20 has similar to the packaging 1 a bottom (not shown) and a peripheral wall 21 on to a plastic flange 22, 23, 24, 25 is arranged. The plastic flange has a horizontal first part 22, a second part 23 depending on the outside of the peripheral wall 21 and a third part 24 depending on the inside of the peripheral wall 21.

The plastic flange 22, 23, 24, 25 has furthermore a spacer protrusion 25 which keeps nested packages 20 at a distance from each other.

Also in the packaging 20 a plastic barrier foil 26 is lined along the peripheral wall 21 and the plastic flange 22, 23, 24, 25 to fix the plastic flange.

Figure 6:
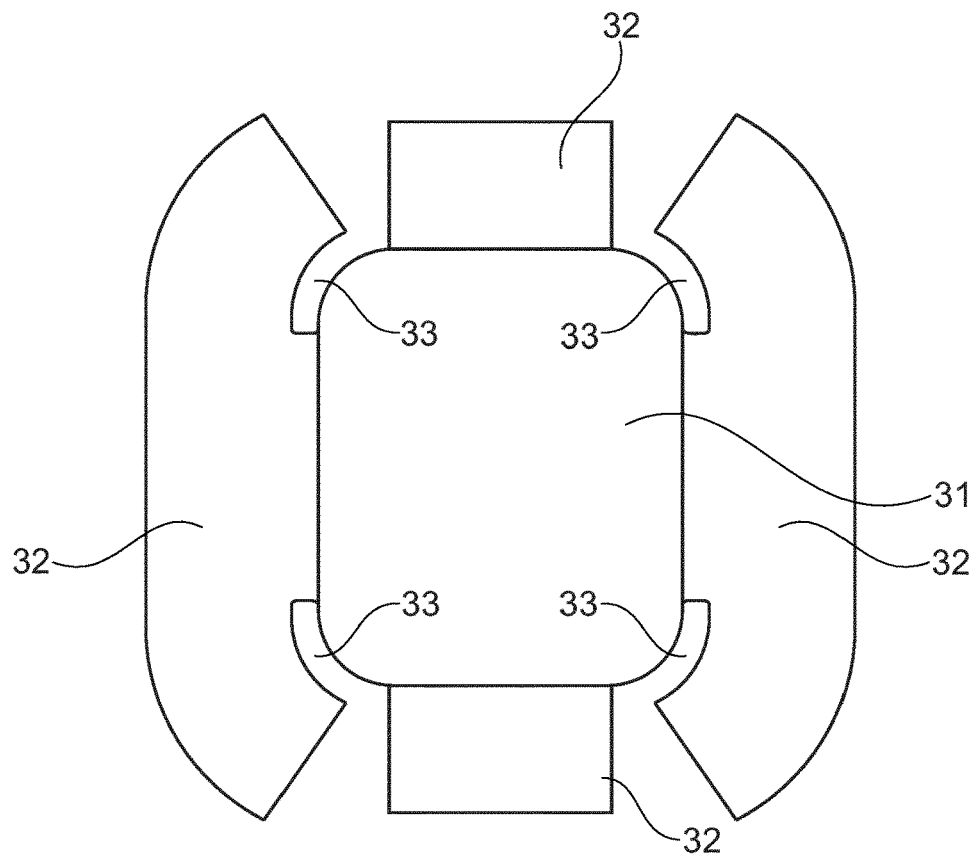
FIG. 6 shows a top view of an unfolded cardboard sheet used for the method of FIGS. 4 and 5.

FIG. 4 shows a schematic cross-sectional view of a first step of a method according to the invention. In a mold 30 a cardboard sheet 31, 32 (see also FIG. 6) is folded to form a tray with a bottom 31 and a peripheral wall 32.

Due to the loose flaps forming the rounding corners of the peripheral wall 32, slits 33 are provided between the bottom 31 and the peripheral wall 32.

A prefabricated plastic flange 34 is positioned over the mold. On top of the plastic flange 34 a barrier foil 35 is already adhered. The prior arrangement of the barrier foil 35 enables easier handling of the plastic flange 34 due to the increased surface. However, the plastic barrier foil 35 could also be arranged when the plastic flange 34 is already arranged on the peripheral wall 31.

Figure 5:
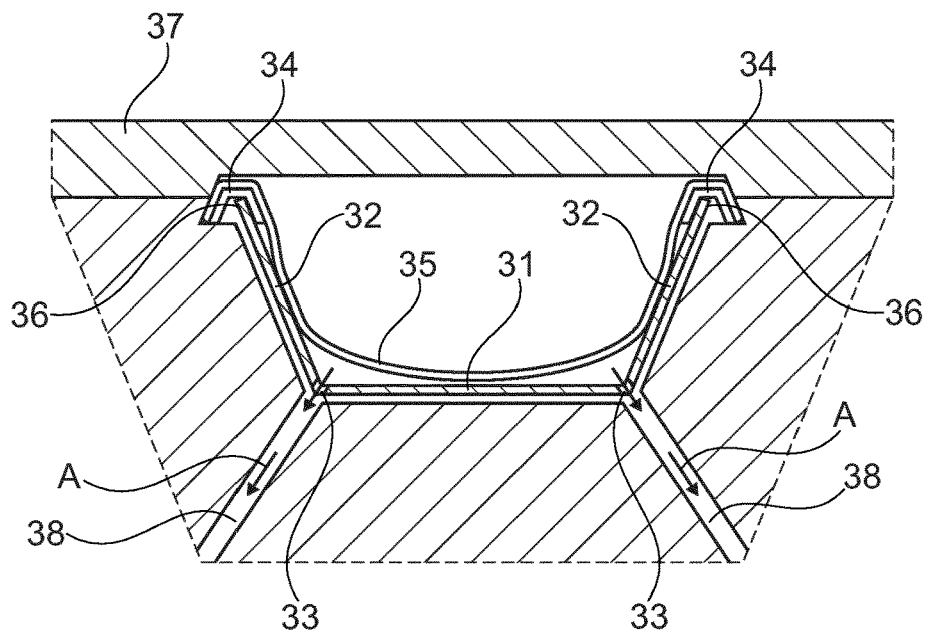
FIG. 5 shows a schematic cross-sectional view of a second step of a method according to the invention.

FIG. 5 shows the next step, in which the plastic flange 34 is arranged on the upper edge 36 of the peripheral wall 32 and a top mold 37 is positioned on top of the mold 30. Then the air A is extracted from the mold cavity via the slits 33 and channels 38, while the plastic barrier foil 35 is heated and pushed against the inner surface of the tray 31, 32 to line the cardboard walls 31, 32 and the plastic flange 34.

Figure 7:
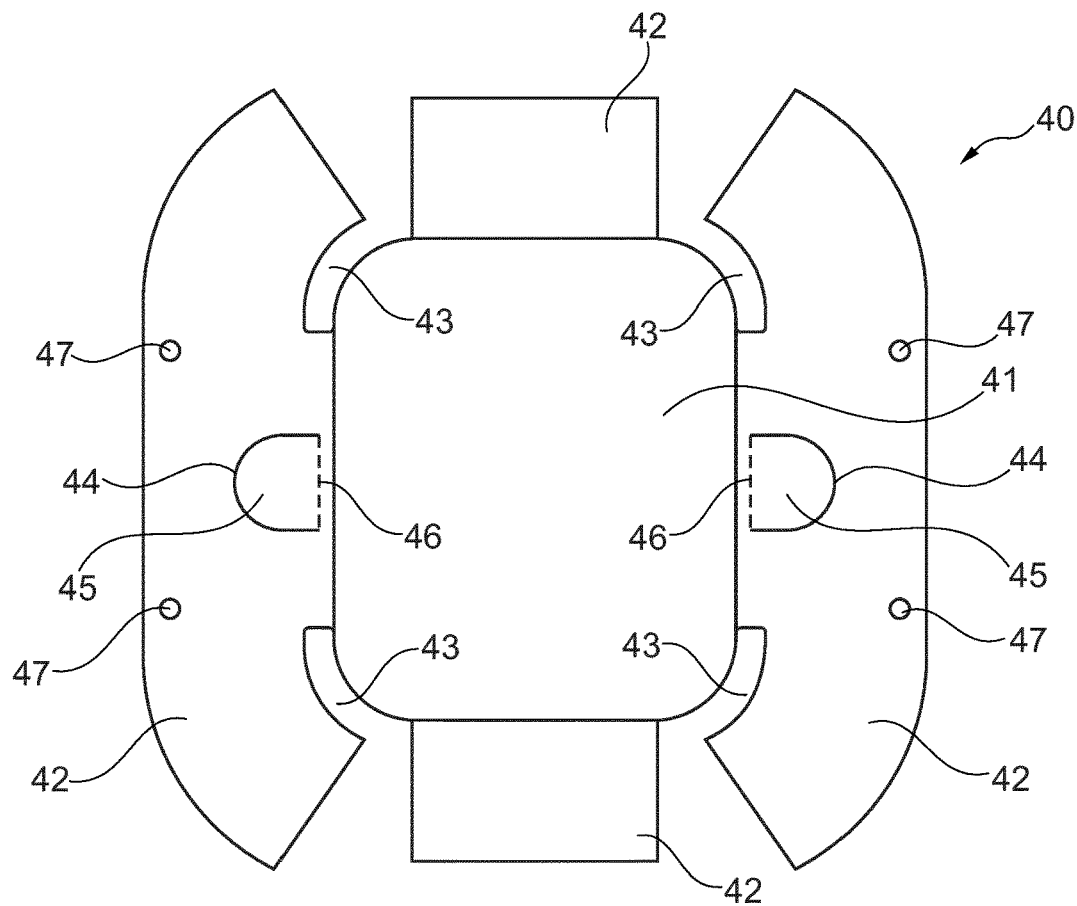
FIG. 7 shows a top view of a second embodiment of an unfolded cardboard sheet.

FIG. 7 shows a top view of a second embodiment of an unfolded cardboard sheet 40. Similar to the unfolded sheet 31, 32, the sheet 40 has a bottom 41 and a peripheral wall 42, which is partially detached from the bottom 41 by slits 43 to allow for rounded corners.

The peripheral wall 42 is furthermore provided with U-shaped cuts 44, such that a flap 45 can be folded out along folding line 46, and a number of positioning holes 47.

Figure 8:
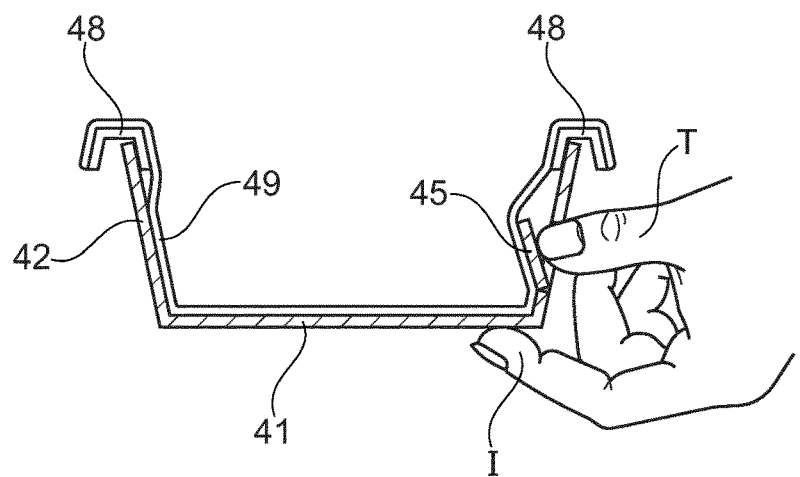
FIG. 8 shows the unfolded sheet of FIG. 7 in a packaging.
Figure 9:
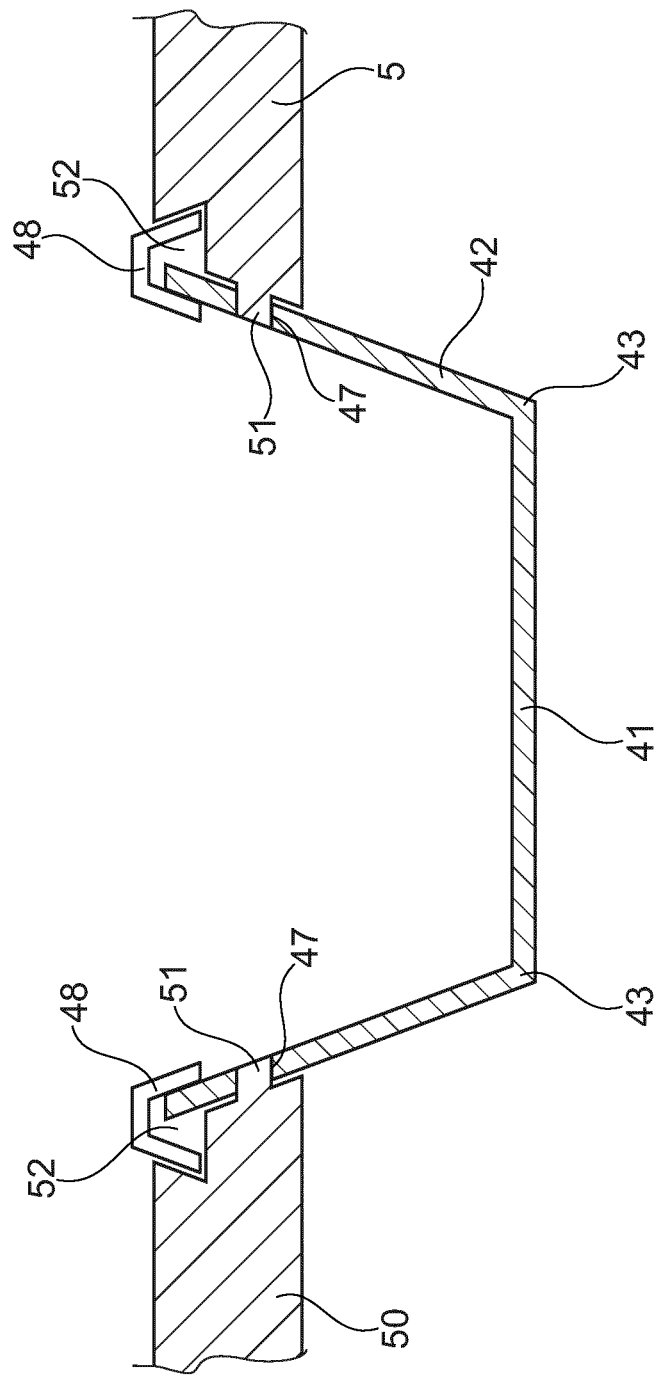
FIG. 9 shows the packaging of FIG. 8 in a link of a transport chain.

In FIG. 8, the sheet 41, 42 is folded into a tray, a plastic flange 48 is arranged on the upper edge of the peripheral wall 42 and a barrier foil 49 is lined to the inside of the tray.

To separate the plastic flange 48 with barrier foil 49 from the cardboard tray 41, 42, a user sticks a thumb T into the wall 42 by folding the flap 45 inward and supports the bottom 41 with at least an index finger I. As a result the user has a firm grip on the cardboard tray 41, 42 allowing to the plastic flange 48 and barrier foil 49 to be pulled out easily.

During manufacturing the folded sheet 41, 42 could be positioned in a link 50 of a transport chain, instead of a mold, as shown in FIG. 4. The link 50 has protrusions 51, which extend through the positioning holes 47, such that the tray 41, 42 is firmly held in the link 50.

The link 50 also has a cavity 52 in which the plastic flange 48 is snapped into. With these features, the link 50 can be used as part of a mold, when the barrier foil is to be arranged into the tray 41, 42. In such a case, a cover mold part is arranged over the link 50 and a bottom mold part is positioned under the link 50.

The invention claimed is:

1. A packaging for modified atmosphere packaging, comprising:
    a cardboard tray having a bottom and an upstanding peripheral wall, wherein the upstanding peripheral wall has an inner surface and has an upper edge with no cardboard flange extending therefrom;
    a plastic flange, distinct from the cardboard tray, arranged on top of and in direct contact with the upper edge of the peripheral wall, which plastic flange has in cross-section a first part extending horizontally, substantially parallel to the bottom of the tray, a second part depending from the first part downward along the outside of the peripheral wall and a third part depending from the first part, opposite of the second part, along the inside of the peripheral wall, wherein the third part lies against the inner surface of the peripheral wall and wherein the second part is spaced outwardly from the upper edge; and
    a plastic barrier foil adhered to and lining the inside of the cardboard tray and extending over the plastic flange to fix the plastic flange onto the upstanding peripheral wall of the cardboard tray.

2. The packaging according to claim 1, wherein at least one spacer protrusion is arranged to the first part of the plastic flange, which at least one spacer protrusion depends downward along the outside of the peripheral wall.

3. The packaging according to claim 2, wherein the plastic flange is provided with a perforation line extending over the width of the flange and wherein a tear lip is arranged to the plastic flange adjacent to the perforation line.

4. The packaging according to claim 3, wherein the cardboard tray is folded out of an unfolded sheet, wherein the bottom of the cardboard tray has rounded corners, and wherein slits are formed between the rounded corners of the bottom and the peripheral wall.

5. The packaging according to claim 2, wherein the cardboard tray is folded out of an unfolded sheet, wherein the bottom of the cardboard tray has rounded corners, and wherein slits are formed between the rounded corners of the bottom and the peripheral wall.

6. The packaging according to claim 1, wherein the plastic flange is provided with a perforation line extending over the width of the flange and wherein a tear lip is arranged to the plastic flange adjacent to the perforation line.

7. The packaging according to claim 6, wherein the cardboard tray is folded out of an unfolded sheet, wherein the bottom of the cardboard tray has rounded corners, and wherein slits are formed between the rounded corners of the bottom and the peripheral wall.

8. The packaging according to claim 1, wherein the cardboard tray is folded out of an unfolded sheet, wherein the bottom of the cardboard tray has rounded corners, and wherein slits are formed between the rounded corners of the bottom and the peripheral wall.

9. The packaging according to claim 1, wherein a number of positioning holes are provided along the upper part of the peripheral wall.

10. The packaging according to claim 1, wherein at least one flap is arranged in the peripheral wall to provide an opening in the peripheral wall for better grip.

11. A method for manufacturing a packaging according to claim 1, which method comprises the steps of:
    providing, for example by injection molding or deep drawing, a plastic flange having in cross-section a first part extending horizontally and a second part depending from the first part;
    providing an unfolded cardboard sheet and inserting the unfolded sheet into a mold to form a cardboard tray having a bottom and an upstanding peripheral wall;

positioning the plastic flange onto the upper edge of the upstanding peripheral wall, such that the second part of the plastic flange extends downward along the outside of the peripheral wall; and providing a plastic barrier foil over the plastic flange, heating said plastic barrier foil and pushing the heated plastic barrier foil into the formed cardboard tray, such that the plastic barrier foil adheres to and lines the inside of the cardboard tray and extends over the plastic flange to fix the plastic flange onto the cardboard tray.

12. The method according to claim 11, wherein the plastic barrier foil is first fixed to the plastic flange, before the plastic flange is positioned onto the upper edge of the upstanding peripheral wall.

13. The method according to claim 11, wherein after folding of the cardboard tray slits are provided between the bottom and the bottom edge of the peripheral wall and wherein a low pressure is generated on the outside of the cardboard tray, such that the heated plastic barrier foil is pushed into the cardboard tray by a pressure difference over the heated plastic barrier foil.

\* \* \* \* \*